United States Patent
Bond

(10) Patent No.: US 9,424,081 B2
(45) Date of Patent: Aug. 23, 2016

(54) MANAGING CALLBACK OPERATIONS IN EMULATED ENVIRONMENTS

(71) Applicant: MICROSOFT TECHNOLOGY LICENSING, LLC, Redmond, WA (US)

(72) Inventor: Barry Clayton Bond, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/570,767

(22) Filed: Dec. 15, 2014

(65) Prior Publication Data
US 2016/0170797 A1    Jun. 16, 2016

(51) Int. Cl.
G06F 9/46    (2006.01)
G06F 9/48    (2006.01)
G06F 9/52    (2006.01)

(52) U.S. Cl.
CPC ............ G06F 9/4843 (2013.01); G06F 9/4812 (2013.01); G06F 9/52 (2013.01)

(58) Field of Classification Search
CPC .............................. G06F 9/4843; G06F 9/4812
USPC ................ 718/1, 100–108; 717/100–106
See application file for complete search history.

(56) References Cited

U.S. PATENT DOCUMENTS

| | | | |
|---|---|---|---|
| 6,718,294 B1 | 4/2004 | Bortfel | |
| 6,886,162 B1* | 4/2005 | McKenney | G06F 9/526 711/124 |
| 7,207,041 B2* | 4/2007 | Elson | G06F 9/5011 718/1 |
| 7,249,211 B2 | 7/2007 | Wieland et al. | |
| 7,249,355 B2* | 7/2007 | O'Neill | G06F 9/5044 718/100 |
| 7,325,083 B2 | 1/2008 | Watt et al. | |
| 7,496,495 B2 | 2/2009 | Solomon et al. | |
| 7,565,279 B2 | 7/2009 | Bordes | |
| 7,657,890 B2* | 2/2010 | Kanai | G06F 9/45533 711/100 |
| 7,818,746 B2* | 10/2010 | Anderson | G06F 11/3428 702/108 |
| 7,827,559 B1* | 11/2010 | Rhee | G06F 9/526 718/102 |
| 8,127,301 B1* | 2/2012 | Waldspurger | G06F 9/45533 718/1 |
| 8,136,104 B2* | 3/2012 | Papakipos | G06F 8/20 717/136 |
| 8,261,270 B2* | 9/2012 | Papakipos | G06F 9/5027 345/503 |
| 8,271,837 B2 | 9/2012 | Prophete et al. | |
| 8,296,490 B2 | 10/2012 | Li et al. | |

(Continued)

OTHER PUBLICATIONS

Liskov et al, "Promises: Linguistic Support for Efficient Asynchronous Procedure Calls in Distributed Systems", ACM, pp. 260-267, 1988.*

(Continued)

*Primary Examiner* — Anil Khatri
(74) *Attorney, Agent, or Firm* — Aaron Chatterjee; Judy Yee; Micky Minhas

(57) ABSTRACT

Examples of the disclosure enable callback operations, such as interrupts, Asynchronous Procedure Calls (APCs), and Deferred Procedure Calls (DPCs), to be efficiently managed. In some examples, an emulated thread includes a request for a callback operation. When the request is detected, the emulated thread and/or a cooperating thread associated with the callback operation is executed based on an execution mode associated with the callback operation. Examples of the disclosure manage callback operations while efficiently managing system resources, including processor load, by providing at least one cooperating thread that consumes little or no processing power until the callback operation is ready to be executed.

20 Claims, 6 Drawing Sheets

(56) References Cited

U.S. PATENT DOCUMENTS

| | | | | |
|---|---|---|---|---|
| 8,381,202 | B2 * | 2/2013 | Papakipos | G06F 8/45 717/149 |
| 8,418,179 | B2 * | 4/2013 | Papakipos | G06F 9/5027 717/140 |
| 8,458,716 | B2 * | 6/2013 | Altrichter | G06Q 10/06 711/170 |
| 8,499,299 | B1 * | 7/2013 | Jakab | G06F 9/45504 710/200 |
| 8,516,451 | B2 | 8/2013 | Tendler et al. | |
| 8,635,612 | B2 * | 1/2014 | Oney | G06F 9/45533 718/1 |
| 8,719,817 | B2 * | 5/2014 | Aswani | G06F 9/45558 718/1 |
| 2008/0016396 | A1 | 1/2008 | Higashi et al. | |
| 2011/0119043 | A1 | 5/2011 | Vanspauwen et al. | |
| 2011/0258594 | A1 | 10/2011 | Syme et al. | |

OTHER PUBLICATIONS

Ananda et al, "A Survey of Asynchronous Remote Procedure Calls", ACM, pp. 92-109, 1992.*

Ganusov et al, "Efficient Emulation of Hardware Prefetchers via Event Driven Helper Threading", ACM, pp. 144-153, 2006.*

Beltrame et al, "Concurrency Emulation and Analysis of Parallel Applications for Multi-Processor System-on-Chip Co-Design", ACM, pp. 7-12, 2008.*

Chen et al, "Scalable Deterministic Replay in a Parallel Full-system Emulator ", ACM, pp. 207-217, 2013.*

Bruening et al, "Thread-Shared Software Code Caches", IEEE, pp. 1-11, 2006.*

Diamos et al, "SIMD Re-Convergence At Thread Frontiers", ACM, pp. 477-488, 2011.*

Wang et al, "COREMU: A Scalable and Portable Parallel Full-system Emulator ", ACM, pp. 213-222, 2011.*

"FreeRTOS Windows Simulator—For Visual Studio or Eclipse and MingW", Published on: Feb. 15, 2014, Available at: http://www.freertos.org/FreeRTOS-Windows-Simulator-Emulator-for-Visual-Studio-and-Eclipse-MingW.html, 5 pages.

Wang, et al., "COREMU: A Scalable and Portable Parallel Full-system Emulator", In Proceeding of the 16th ACM Symposium on Principles and Practice of Parallel Programming, Feb. 12, 2011, 10 pages.

Kumar, et al., "A New Methodology for Hardware Software Co-Verification", In Proceeding of the Synopsys India Pvt Ltd., Jun. 26, 2013, 8 pages.

* cited by examiner

MANAGING CALLBACK OPERATIONS IN EMULATED ENVIRONMENTS

BACKGROUND

Some computing devices include threads configured to execute operations. To execute operations not included in the threads, at least some known computing devices may introduce callback operations, such as an interrupt. Some existing systems manage threads and callback operations in hardware (e.g., hardware clock interrupt or thread scheduler), or by injecting polled checks for pending callback operations into each thread, such as at instruction boundaries, block boundaries, and branches. However, increasing a number of polled checks generally leads to slower processing times, and decreasing the number of polled checks generally leads to an increased risk of untimely interrupt delivery.

SUMMARY

Examples of the disclosure enable at least one callback operation to be managed. Some examples include a callback detection component that causes at least one processor to detect a request for a callback operation and determine an execution mode associated with the callback operation, and a thread execution component that causes the at least one processor to execute a first thread including the request for the callback operation and, based on the execution mode, execute one or more of the first thread and a second thread associated with the callback operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Examples of the disclosure enable callback operations, such as an interrupt, an Asynchronous Procedure Call (APC), a Deferred Procedure Call (DPC), and/or other operations, to be efficiently managed. In some examples, an emulated thread includes a request for a callback operation. When the request is detected, an execution mode is determined, and the emulated thread and/or a cooperating thread associated with the callback operation is executed based on the execution mode. In some examples, an asynchronous interrupt is simulated without injecting a polling check in a thread.

Aspects of the disclosure enable callback operations to be effectively handled and/or managed while efficiently managing system resources by blocking at least one cooperating thread until the callback operation is ready to be executed. In this way, a plurality of cooperating threads may be used to host a plurality of asynchronous callback operations that increase a functionality of a system while consuming little or no additional processing power. For example, the cooperating threads may enable the system to be compatible with games or applications designed for other processing architectures. By incorporating a plurality of cooperating threads in the manner described in this disclosure, some examples increase system functionality, increase user interaction performance, reduce processor load, and/or improve operating system resource allocation.

Figure 1:
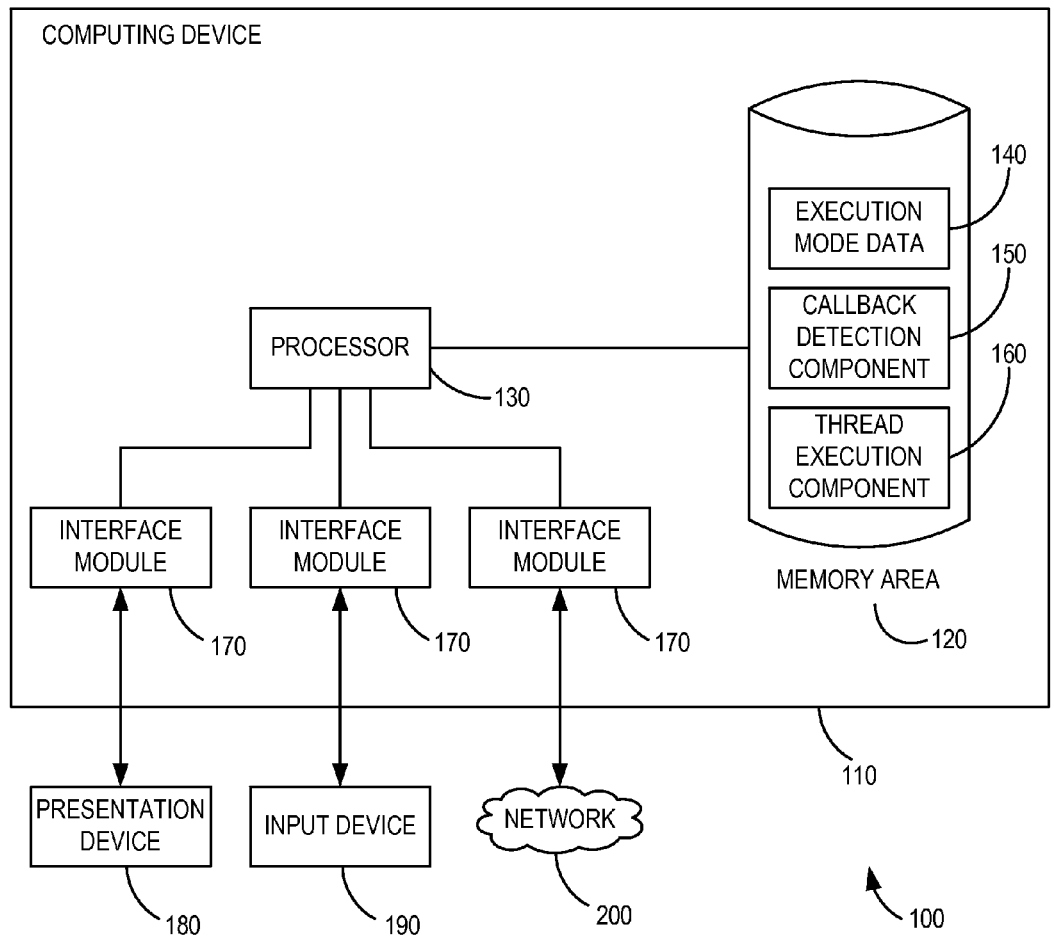
FIG. 1 is an example block diagram illustrating a computing device.

Referring to FIG. 1, an example block diagram of a system 100 is provided. In the example of FIG. 1, the system 100 includes a computing device 110, such as a gaming console. While some examples of the disclosure are illustrated and described herein with reference to the computing device 110 being a gaming console, aspects of the disclosure are operable with any device that executes instructions (e.g., as application programs, operating system functionality, or both) to implement the operations and functionality associated with the computing device 110. For example, the computing device 110 may include a portable media player, mobile telephone, tablet, netbook, laptop, desktop personal computer, computing pad, kiosks, tabletop devices, industrial control devices, wireless charging stations, electric automobile charging stations, and other computing devices. Additionally, the computing device 110 may represent a group of processing units or other computing devices.

The computing device 110 includes one or more computer-readable media, such as a memory area 120 storing computer-executable instructions, gaming data, and/or other data, and at least one processor 130 programmed to execute the computer-executable instructions for implementing aspects of the disclosure. The memory area 120 includes any quantity of media associated with or accessible by the computing device 110. The memory area 120 may be internal to the computing device 110 (as shown in FIG. 1), external to the computing device 110 (not shown), or both (not shown).

In some examples, the memory area 120 stores, among other data, one or more applications. The applications, when executed by the processor 130, operate to perform functionality on the computing device 110. Example applications include mail application programs, web browsers, calendar application programs, address book application programs, messaging programs, media applications, location-based services, search programs, and the like. The applications may communicate with counterpart applications or services such as web services accessible via a network (not shown). For example, the applications may represent downloaded client-side applications that correspond to server-side services executing in a cloud.

In this example, the memory area 120 stores one or more computer-executable components for automatically managing a callback including, but not limited to, execution mode data 140, a callback detection component 150 and/or a thread execution component 160. While the execution mode data 140, the callback detection component 150, and the thread execution component 160 are shown to be stored in the memory area 120, the execution mode data 140, the callback detection component 150, and/or the thread execution component 160 may be stored and/or executed from a memory area remote from the computing device 110. For example, the execution mode data 140, the callback detection component 150, and/or the thread execution component 160 may be stored in a cloud service, a database, or other memory area accessible by the computing device 110. Such examples reduce the computational and storage burden on the computing device 110.

The processor 130 includes any quantity of processing units, and the instructions may be performed by the processor 130 or by multiple processors within the computing device 110 or performed by a processor external to the computing device 110. In some examples, the processor 130 is programmed to execute instructions such as those illustrated in the figures (e.g., FIGS. 6 and 7).

In some examples, the processor 130 is transformed into a special purpose microprocessor by executing computer-executable instructions or by otherwise being programmed. For example, the callback detection component 150, when executed by the processor 130, causes the processor 130 to detect a callback operation targeting the base thread 240 and determine an execution mode associated with the callback operation. The execution mode data 140 corresponds to a plurality of execution modes that may be determined by the processor 130. Additionally, the thread execution component 160, when executed by the processor 130, causes the processor 130 to execute the base thread 240 and, based on the execution mode, execute the base thread 240 and/or the callback thread 260. For example, the thread execution component 160 causes the processor 130 to execute, block, suspend, delay, wake, skip (e.g., not execute), or otherwise interact with one or more threads based on the execution mode.

Based on the execution mode, in at least some implementations, the thread execution component 160, when executed by the processor 130, causes the processor 130 to suspend an implementation of a base operation associated with the base thread 240, and implement the callback operation 250 while the implementation of the base operation is suspended. Based on the execution mode, in at least some implementations, the thread execution component 160, when executed by the processor 130, causes the processor 130 to simultaneously implement the callback operation 250 with a base operation associated with the base thread 240. Although processor 130 is shown separate from the memory area 120, examples of the disclosure contemplate that the memory area 120 may be onboard the processor 130 such as in some embedded systems.

In some examples, the computing device 110 includes at least one interface module 170 for exchanging data between the computing device 110 and a user, computer-readable media, and/or another computing device (not shown). In at least some examples, the interface module 170 is coupled to a presentation device 180 configured to present information, such as text, images, audio, video, graphics, alerts, and the like, to the user. For example, the presentation device 180 may include, without limitation, a display, speaker, and/or vibrating component. Additionally or alternatively, the interface module 170 is coupled to an input device 190 configured to receive information, such as user commands, from the user. For example, the input device 190 may include, without limitation, a game controller, camera, microphone, and/or accelerometer. In at least some examples, the presentation device 180 and the input device 190 may be integrated in a common user-interface device (not shown) configured to present information to the user and receive information from the user. For example, the user-interface device may include, without limitation, a capacitive touch screen display and/or a controller including a vibrating component.

In at least some examples, the interface module 170 is coupled to computer-readable media and/or another computing device via a network 200 to enable multi-player gaming and/or automatic sharing of media content and more among computing devices. Communication between the computing device 110 and other computing devices may occur using any protocol or mechanism over any wired or wireless connection.

The block diagram of FIG. 1 is merely illustrative of an example system that may be used in connection with one or more examples of the disclosure and is not intended to be limiting in any way. Further, peripherals or components of the computing device 110 known in the art are not shown, but are operable with aspects of the disclosure. At least a portion of the functionality of the various elements in FIG. 1 may be performed by other elements in FIG. 1, or an entity (e.g., processor, web service, server, application program, computing device, etc.) not shown in FIG. 1.

Figures 2, 3:
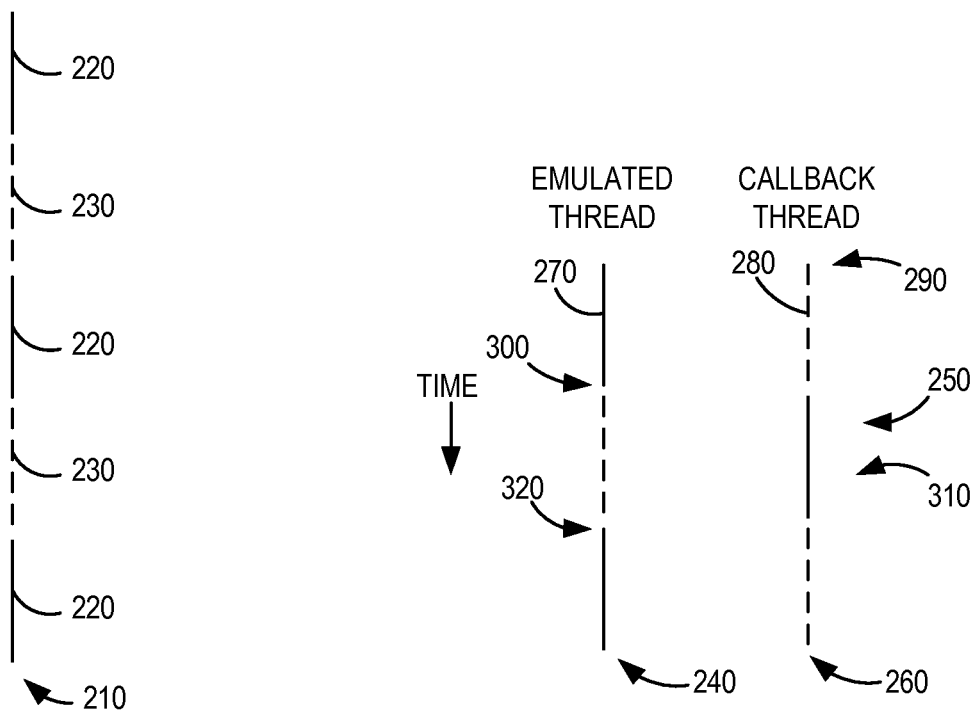
FIG. 2 is an example schematic diagram illustrating a thread that may be implemented using a computing device such as shown in FIG. 1.
FIG. 3 is an example schematic diagram illustrating management of an example callback operation using a computing device such as shown in FIG. 1.

Referring to FIG. 2, the processor 130 (shown in FIG. 1) is programmed to execute (or not execute), and adjust an execution of, a thread 210 based on a type of thread, an execution mode, and/or any other parameter that enables system 100 to function as described herein. In this example, the thread 210 is stored in the memory area 120 (shown in FIG. 1). Alternatively, the thread 210 may be stored in an external computer-readable media, such as a digital optical disc data storage device.

As shown in FIG. 2, in at least some examples, execution of the thread 210 adjusts between a running and/or executing state 220 and a blocked state 230. When the thread 210 is in the blocked state 230, the thread 210 waits for a trigger and/or instruction, such as an interrupt, an APC, and/or a DPC, and consumes little or no processing power while it is waiting for the trigger and/or instruction. Alternatively, the thread 210 may be in any other state (e.g., a parked state, waiting state, or sleep state) that enables the system 100 to function as described herein.

Figure 4:
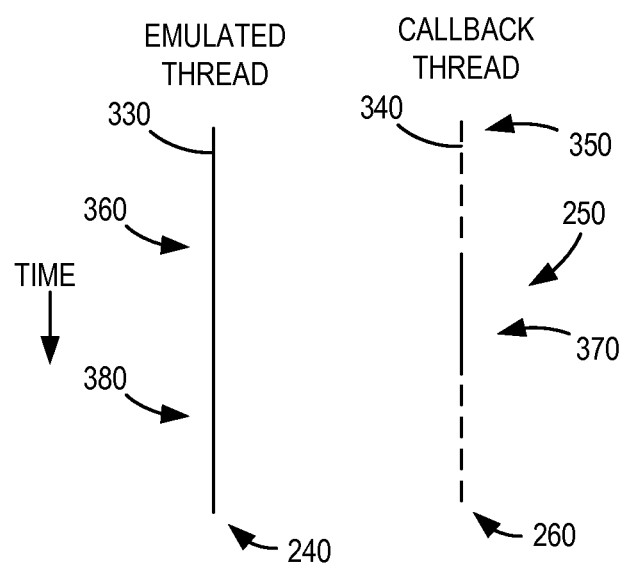
FIG. 4 is an example schematic diagram illustrating management of another example callback operation using a computing device such as shown in FIG. 1.
Figure 5:
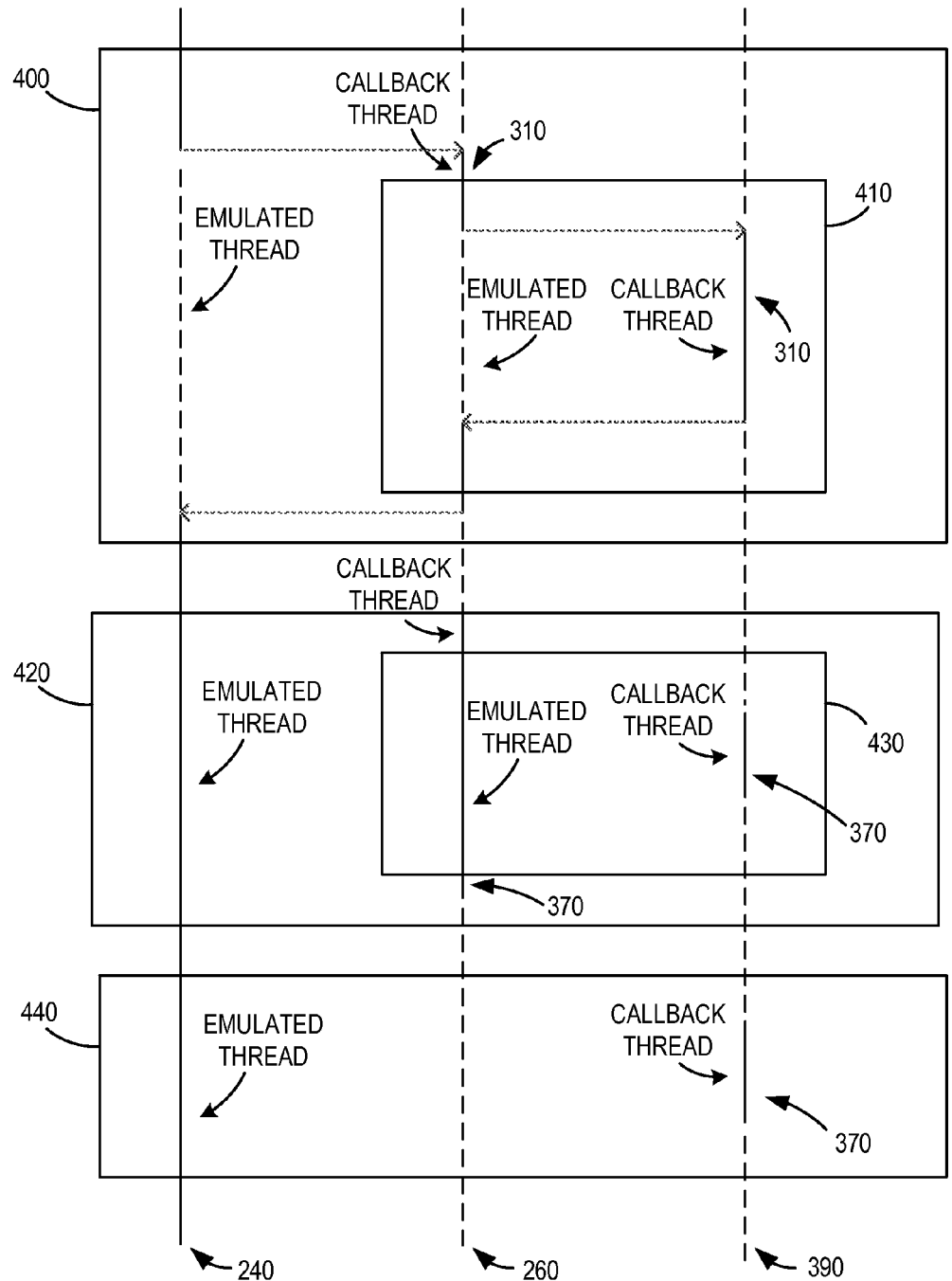
FIG. 5 is an example schematic diagram illustrating management of a plurality of example callback operations using a computing device such as shown in FIG. 1.

In this example, the thread 210 may be any thread including, without limitation, an emulated or base thread or a cooperating or callback thread. Referring to FIGS. 3-5, the processor 130 (shown in FIG. 1) executes a first, emulated or base thread 240, detects a request for an asynchronous callback operation 250, determines an execution mode associated with the callback operation 250, and executes the base thread 240 and/or a second, cooperating or callback thread 260 associated with the callback operation 250 based on the execution mode. The callback operation 250 may be triggered and/or requested by the base thread 240 and/or by a user. In at least some examples, the processor 130 associates the callback thread 260 with at least one parameter associated with the base thread 240 including, without limitation, stack information, thread identify value, and/or processor affinity, such that the callback thread 260 at least temporarily "impersonates" the base thread 240 at least when the callback operation 250 is being implemented.

FIG. 3 is an example schematic diagram illustrating a first segment 270 of the base thread 240 and a first segment 280 of the callback thread 260. At a first moment 290, in this example, the base thread 240 is in an executing state and the callback thread 260 is in a blocked state. At a second moment 300, a request for a first callback operation 310 is determined and/or detected, and a first execution mode is determined based on the first callback operation 310.

In this example, based on the first execution mode, the processor 130 simulates an interrupt of the base thread 240 by blocking the base thread 240 (e.g., changing the base thread 240 to the blocked state), and implements the first callback operation 310 by running and/or executing the callback thread 260 (e.g., changing the callback thread 260 to the executing state). In this example, the first callback operation 310 is implemented exactly or immediately after the second moment 300. Alternatively, the first callback operation 310 may be implemented after some delay after the second moment 300. For example, in one implementation, the first callback operation 310 may be implemented after a predetermined delay after the second moment 300. In another implementation, the first callback operation 310 may be implemented after a variable delay after the second moment 300 (e.g., the first callback operation 310 may be implemented exactly or immediately after base thread 240 is associated with a predetermined state and/or milestone. In other examples, the processor 130 determines not to execute the callback thread 260 based on the execution mode.

Upon determining and/or detecting a predetermined milestone associated with the first callback operation 310 (e.g., completion of the first callback operation 310) at a third moment 320, the processor 130 awakens the base thread 240 by resuming execution of the base thread 240 (e.g., changes the base thread 240 to the executing state), and blocks the callback thread 260 (e.g., changes the callback thread 260 to the blocked state).

FIG. 4 is an example schematic diagram illustrating a second segment 330 of the base thread 240 and a second segment 340 of the callback thread 260. At a first moment 350, in this example, the base thread 240 is in an executing state and the callback thread 260 is in a blocked state. At a second moment 360, a request for a second callback operation 370 is determined and/or detected, and a second execution mode is determined based on the second callback operation 370.

In this example, based on the second execution mode, the processor 130 continues and/or resumes execution of the base thread 240 (e.g., the base thread 240 remains in the executing state), and implements the second callback operation 370 by running and/or executing the callback thread 260 (e.g., changing the callback thread 260 to the executing state). That is, in this example, the callback thread 260 is executed simultaneously with the base thread 240. In this example, the second callback operation 370 is implemented exactly or immediately after the second moment 360. Alternatively, the second callback operation 370 may be implemented after a predetermined delay after the second moment 360. In other examples, the processor 130 determines not to execute the callback thread 260 based on the execution mode.

Upon detecting and/or determining a predetermined milestone associated with the second callback operation 370 (e.g., completion of the second callback operation 370) at a third moment 380, the processor 130 continues and/or resumes execution of the base thread 240 (e.g., the base thread 240 remains in the executing state) and blocks the callback thread 260 (e.g., changes the callback thread 260 to the blocked state).

In some examples, the processor 130 is programmed to manage any combination of base threads 240, callback operations 250, callback threads 260, and/or execution modes. For example, the base thread 240 may include any combination of the first segment 270 and the second segment 330 in a serial arrangement, and the callback thread 260 may include any combination of the first segment 280 and the second segment 340 in a serial arrangement. Moreover, in at least some implementations, the callback thread 260 is a base thread 240 (e.g., the callback thread 260 is the emulated thread) for a second callback thread 390 (FIG. 5) that includes any combination of the first segment 280 and the second segment 340 in a serial arrangement, such that the base thread 240, the callback thread 260, and the second callback thread 390 are in a nested configuration.

For example, as shown in FIG. 5, a first window 400 is associated with a request for a first callback operation 310 targeting the base thread 240. In this example, the base thread 240 is the emulated thread, and the callback thread 260 executes the first callback operation 310. A second window 410 is nested within the first window 400 and is associated with a request for a first callback operation 310 targeting the callback thread 260. In this example, the callback thread 260 is the base or emulated thread, and the second callback thread 390 executes the first callback operation 310. Additionally or alternatively, the second window 410 may include a request for a second callback operation 370 targeting the callback thread 260, wherein the second callback thread 390 includes the second callback operation 370.

A third window 420 is associated with a request for a second callback operation 370 targeting the base thread 240. In this example, the base thread 240 is the emulated thread, and the callback thread 260 executes the second callback operation 370. A fourth window 430 is nested within the third window 420 and is associated with a request for a second callback operation 370 targeting the callback thread 260. In this example, the callback thread 260 is the base or emulated thread, and the second callback thread 390 executes the second callback operation 370. Additionally or alternatively, the fourth window 430 may include a request for a first callback operation 310 targeting the callback thread 260, wherein the second callback thread 390 includes the first callback operation 310.

A fifth window 440 is associated with a request for a second callback operation 370 targeting the base thread 240, wherein the second callback thread 390 includes the second callback operation 370. In this example, the base thread 240 is the emulated thread, and the second callback thread 390 executes the second callback operation 370. As shown in at least FIG. 5, the processor 130 is programmed to manage any combination of base threads 240, callback operations 250, callback threads 260, and/or execution modes.

Figure 6:
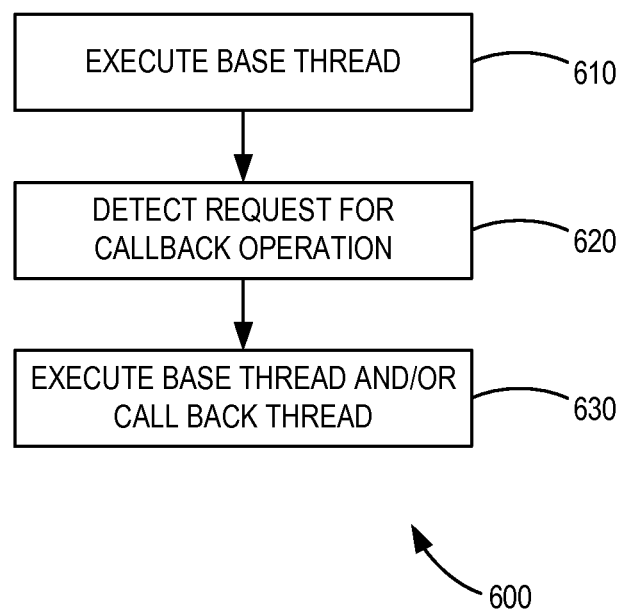
FIG. 6 is an example flow chart illustrating operation of a computing device, such as shown in FIG. 1, to manage at least one callback operation.

FIG. 6 is an example flow chart of a method 600 illustrating operation of the computing device 110 (shown in FIG. 1) to manage at least one callback operation. In this example, a base thread is executed at 610, and a request for a callback operation is detected at 620. One or more of the base thread and the callback thread is then executed at 630 based on an execution mode associated with the first callback operation.

Figure 7:
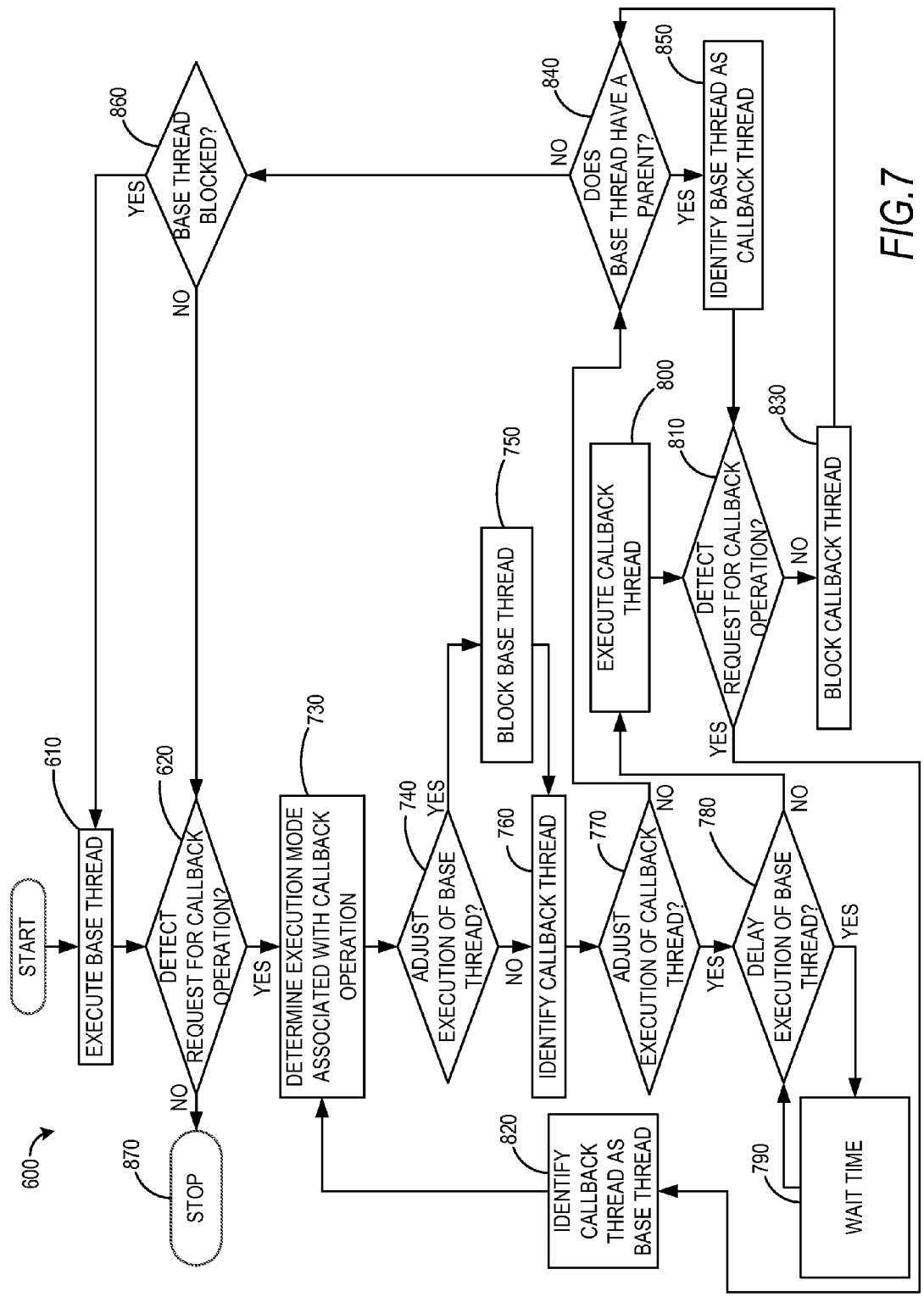
FIG. 7 is an example detailed flow chart illustrating operation of a computing device, such as shown in FIG. 1, to manage at least one callback operation.

FIG. 7 is an example detailed flow chart of the method 600 shown in FIG. 6. As also shown in FIG. 6, a base thread is executed at 610, and a request for a callback operation is detected at 620. In this example, an execution mode associated with the callback operation is determined at 730, and the base thread and/or a callback thread associated with the callback operation are executed based on the execution mode. For example, the execution mode may enable system resources, including processor load and/or memory, to be effectively managed.

In some examples, each decision in the method 600 is determined based on the execution mode. For example, in at least some examples, the execution of the base thread is adjusted at 740 based on the execution mode. In some implementations, the base thread is blocked at 750 (e.g., the base thread is changed to the blocked state) and, thus, an implementation of a base operation associated with the base thread is suspended. In other implementations, the execution of the base thread resumes (e.g., the base thread remains in the executing state) and, thus, the implementation of the base operation associated with the base thread is continued.

In this example, the callback thread associated with the callback operation is identified at 760 and, in at least some examples, the execution of the callback thread is adjusted at 770 based on the execution mode. For example, in one implementation, the callback thread is awakened by executing at 800 the callback thread (e.g., the callback thread is changed to the executing state). In another implementation, execution of the callback thread is delayed at 780 by waiting at 790 a predetermined amount of time before the callback thread is executed at 800. Alternatively, the execution of the callback thread may be adjusted at 770 in any manner that enables the system 100 to function as described herein. In at least some examples, the callback thread is associated with at least one parameter associated with the base thread, such that the callback thread at least temporarily "impersonates" the base thread at least when the callback operation is being implemented.

In at least some examples, the execution of the callback thread is not adjusted at 770 based on the execution mode (e.g., the callback thread remains in the blocked state). For example, the processor 130 may determine to not execute the callback thread. In this example, when the base thread is blocked, the base thread is awakened by executing at 610 the base thread, and the processor 130 seeks and/or waits for another request for a callback operation or the process stops at 870. When the base thread is not blocked (e.g., the base thread continues to execute), the processor 130 seeks and/or waits for another request for a callback operation or the process stops at 870.

In at least some examples, another request for a callback operation may be detected at 810 during execution at 800 of the callback thread (e.g., a nested configuration). When a secondary callback operation targets a primary callback thread executing a primary callback operation for a base thread, the primary callback thread is a "base" thread with respect to the secondary callback operation. Accordingly, in this example, the primary callback thread is recognized and/or identified at 820 as a base or emulated thread with respect to the secondary callback operation. A second execution mode is determined at 730 for the now-identified base, primary callback thread (which is a callback thread with respect to the original base thread) and/or a secondary callback thread associated with the secondary callback operation.

In this example, a callback thread is blocked at 830 after completion of a callback operation. In at least some examples, it is determined at 840 whether the base thread has a parent (e.g., whether the "base" thread is a callback thread with respect to another thread). When a base thread is determined at 840 to have a parent (e.g., the "base" thread is a callback thread with respect to another thread), the base thread is identified at 850 as a callback thread, and the now-identified callback thread executes and/or completes a callback operation for its base thread. When a base thread is determined at 840 to not have a parent (e.g., the base thread is not a callback thread with respect to another thread), it is determined at 860 whether the base thread is blocked. When the base thread is blocked, the base thread is awakened by executing at 610 the base thread, and the processor 130 seeks and/or waits for another request for a callback operation or the process stops at 870. When the base thread is not blocked (e.g., the base thread continues to execute), the processor 130 seeks and/or waits for another request for a callback operation or the process stops at 870.

As described above, in at least some examples, the execution of the callback thread is not adjusted at 770 based on the execution mode. When a base thread is determined at 840 to have a parent, the base thread is identified at 850 as a callback thread, and the now-identified callback thread executes and/or completes a callback operation for its base thread. When a base thread is determined at 840 to not have a parent, the base thread is awakened by executing at 610 the base thread when the base thread is blocked, and the processor 130 seeks and/or waits for another request for a callback operation or the process stops at 870.

The subject matter described herein enables callback operations to be efficiently managed. For example, in one implementation, the examples of the disclosure enable a video game and/or entertainment system to be executed and/or be compatible with games or applications configured for other video game and/or entertainment systems. In another implementation, the examples of the disclosure enable games or applications configured for a mobile device, such as a mobile device executing ANDROID brand mobile operating system software, to be executed and/or compatible with another mobile device, such as a mobile device executing WINDOWS brand operating system software. ANDROID brand mobile operating system software is a trademark of Google Inc., and WINDOWS brand operating system software is a trademark of Microsoft Corporation.

Example computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when configured to execute the instructions described herein.

The examples illustrated and described herein as well as examples not specifically described herein but within the scope of aspects of the disclosure constitute example means for managing callback operations. For example, the elements illustrated in FIG. 1, such as when encoded to perform the operations illustrated in FIGS. 6 and 7, constitute example means for executing a thread, example means for detecting a request for a callback operation, and example means for determining an execution mode associated with the callback operation.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:
  executing an emulated thread;
  detecting a request for an asynchronous callback operation
  the asynchronous callback operation associated with an asynchronous callback thread;
  determining an execution mode associated with the asynchronous callback operation;
  executing one or more of the emulated thread and the asynchronous callback thread based on the execution mode;
  adjusting the execution of the emulated thread based on the execution mode;
  suspending an implementation of a base operation associated with the base thread based on the execution mode;
  simulating an interrupt of the emulated thread by blocking the emulated thread based on the execution mode;
  implementing the asynchronous callback operation while the interrupt is simulated based on the execution mode;
  blocking the asynchronous callback thread based on the execution mode;
  resuming execution of the emulated thread based on the execution mode;
  executing the asynchronous callback thread simultaneously with the emulated thread based on the execution mode;
  delaying the execution of the asynchronous callback thread based on the execution mode;
  determining not to execute the asynchronous callback thread based on the execution mode;
  associating the asynchronous callback thread with a parameter associated with the emulated thread;
  detecting a request for a second asynchronous callback operation
  the second asynchronous callback operation associated with the asynchronous callback thread;
  the second asynchronous callback operation associated with a second asynchronous callback thread;
  determining a second execution mode associated with the one of the emulated thread and the asynchronous callback thread;
  executing one or more of the emulated thread, the asynchronous callback thread, and the second asynchronous callback thread based on the second execution mode;
  a callback detection component that, when executed by at least one processor, causes the at least one processor to detect a request for a callback operation;
  a callback detection component that, when executed by at least one processor, causes the at least one processor to determine an execution mode associated with the callback operation;
  a thread execution component that, when executed by at least one processor, causes the at least one processor to execute a first thread including the request for the callback operation;
  a thread execution component that, when executed by at least one processor, causes the at least one processor to execute one or more of the first thread and a second thread associated with the callback operation based on the execution mode;
  a thread execution component that, when executed by at least one processor, causes the at least one processor to suspend an implementation of a base operation associated with the first thread based on the execution mode;
  a thread execution component that, when executed by at least one processor, causes the at least one processor to implement the callback operation while the implementation of the base operation is suspended based on the execution mode; and
  a thread execution component that, when executed by at least one processor, causes the at least one processor to simultaneously implement the callback operation with a base operation associated with the first thread based on the execution mode.

In some examples, the operations illustrated in FIGS. 6 and 7 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A system comprising:
   a memory area associated with a computing device, said memory area storing instructions for managing a callback; and
   a processor programmed to:
      execute an emulated thread;
      detect a request for a first asynchronous callback operation, the first asynchronous callback operation associated with a first asynchronous callback thread;
      determine a first execution mode associated with the first asynchronous callback operation; and
      based on the first execution mode, adjust the execution of the emulated thread and execute the first asynchronous callback thread associated with the first asynchronous callback operation.

2. The system of claim 1, wherein the processor is further programmed to adjust the execution of the first asynchronous callback thread based on an identification of the first asynchronous callback thread and the first execution mode.

3. The system of claim 1, wherein the processor is further programmed to, based on the first execution mode:
   simulate an interrupt of the emulated thread by blocking the emulated thread;
   implement the first asynchronous callback operation while the interrupt is simulated;
   block the first asynchronous callback thread; and
   unblock the emulated thread.

4. The system of claim 1, wherein the processor is further programmed to, based on the first execution mode, execute the first asynchronous callback thread simultaneously with the emulated thread.

5. The system of claim 1, wherein the processor is further programmed to, based on the first execution mode, delay the execution of the first asynchronous callback thread.

6. The system of claim 1, wherein the processor is further programmed to, based on the first execution mode, determine not to execute the first asynchronous callback thread.

7. The system of claim 1, wherein the processor is further programmed to associate the first asynchronous callback thread with a parameter associated with the emulated thread.

8. The system of claim 1, wherein the processor is further programmed to:
   detect a request for a second asynchronous callback operation, the second asynchronous callback operation associated with a second asynchronous callback thread;
   determine a second execution mode associated with the emulated thread and the first asynchronous callback thread; and
   based on the second execution mode, execute one or more of the emulated thread, the first asynchronous callback thread, and the second asynchronous callback thread.

9. A method executing on a computing device for managing at least one callback operation, said method comprising:
   executing, by a processor, a base thread;
   detecting a request for a first callback operation, the first callback operation associated with a first callback thread;
   based on a first execution mode associated with the first callback operation,
   adjusting the execution of the base thread and executing the first callback thread.

10. The method of claim 9, wherein the execution of the first callback thread is adjusted based on an identification of the first callback thread and the first execution mode.

11. The method of claim 9, further comprising, based on the first execution mode, suspending an implementation of a base operation associated with the base thread.

12. The method of claim 9, further comprising, based on the first execution mode, executing the first callback thread simultaneously with the base thread.

13. The method of claim 9, further comprising, based on the first execution mode, delaying the execution of the first callback thread.

14. The method of claim 9, further comprising, based on the first execution mode, determining not to execute the first callback thread.

15. The method of claim 9, further comprising associating the first callback thread with a parameter associated with the base thread.

16. The method of claim 9, further comprising:
   detecting a request for a second callback operation, the second callback operation associated with the first callback thread; and
   based on a second execution mode associated with the second callback operation, executing the base thread and the first callback thread.

17. The method of claim 9, further comprising:
   detecting a request for a second callback operation, the second callback operation associated with a second callback thread; and
   based on a second execution mode associated with the second callback operation, executing the first callback thread and the second callback thread.

18. One or more computer storage media embodying computer-executable components, said components comprising:
   a callback detection component that, when executed by at least one processor, causes the at least one processor to detect a request for a callback operation, and determine an execution mode associated with the callback operation; and
   a thread execution component that, when executed by the at least one processor, causes the at least one processor to execute a first thread including the request for the callback operation, and,
   based on the execution mode, execute a second thread associated with the callback operation, wherein the execution of the first thread is adjusted based on the execution mode.

19. The computer storage media of claim 18, wherein the thread execution component, when executed by the at least one processor, further causes the at least one processor to, based on the execution mode, suspend an implementation of a base operation associated with the first thread, and implement the callback operation while the implementation of the base operation is suspended.

20. The computer storage media of claim 18, wherein the thread execution component, when executed by the at least one processor, further causes the at least one processor to, based on the execution mode, simultaneously implement the callback operation with a base operation associated with the first thread.

* * * * *